US008050811B2

(12) United States Patent
Inbarajan et al.

(10) Patent No.: US 8,050,811 B2
(45) Date of Patent: Nov. 1, 2011

(54) METHOD FOR CONTROLLING THE DISTRIBUTION OF VEHICLE-RELATED DATA

(75) Inventors: Krishnaraj Inbarajan, Troy, MI (US); Thomas P. Grau, Rochester, MI (US)

(73) Assignee: General Motors LLC, Detroit, MI (US)

( * ) Notice: Subject to any disclaimer, the term of this patent is extended or adjusted under 35 U.S.C. 154(b) by 1263 days.

(21) Appl. No.: 11/609,579

(22) Filed: Dec. 12, 2006

(65) Prior Publication Data

US 2008/0140571 A1 Jun. 12, 2008

(51) Int. Cl.
*G06F 7/00* (2006.01)

(52) U.S. Cl. .......................................... 701/29; 340/990

(58) Field of Classification Search .............. 701/29–33; 705/13, 28, 22, 29, 400, 413; 340/990, 988, 340/992, 993; 342/457, 357.13
See application file for complete search history.

(56) References Cited

U.S. PATENT DOCUMENTS 6,505,100 B1 * 1/2003 Stuempfle et al. ................ 701/1
6,611,740 B2 8/2003 Lowrey et al.
6,636,790 B1 10/2003 Lightner et al.
6,732,031 B1 5/2004 Lightner et al.
6,732,032 B1 5/2004 Banet et al.
6,879,894 B1 4/2005 Lightner et al.
6,928,348 B1 8/2005 Lightner et al.
7,401,233 B2 * 7/2008 Duri et al. ..................... 713/193
7,401,352 B2 * 7/2008 Duri et al. ......................... 726/1
2004/0185842 A1 * 9/2004 Spaur et al. ................... 455/420
2004/0203696 A1 10/2004 Jijina et al.
2004/0203903 A1 10/2004 Wilson et al.
2005/0075144 A1 * 4/2005 Muramatsu et al. ....... 455/569.2
2006/0106584 A1 5/2006 Oesterling et al.
2008/0039983 A1 2/2008 Oesterling et al.
2008/0119983 A1 5/2008 Inbarajan et al.

FOREIGN PATENT DOCUMENTS

WO WO2005039927 5/2005

* cited by examiner

*Primary Examiner* — Dalena Tran
(74) *Attorney, Agent, or Firm* — Anthony L. Simon; Reising Ethington P.C.

(57) ABSTRACT

A method for controlling the wireless distribution of vehicle-related data that is collected from a vehicle and is distributed to one or more authorized recipients in a confidential manner. This method uses predetermined business rules, which can be maintained and/or applied at the vehicle, at the telematics service provider, or elsewhere, to control the distribution of vehicle-related data. These business rules can determine which pieces of vehicle-related data, if any, are to be sent to which authorized recipients and can do so in a confidential manner that prevents even the telematics service provider from having access to the vehicle-related data.

17 Claims, 2 Drawing Sheets

METHOD FOR CONTROLLING THE DISTRIBUTION OF VEHICLE-RELATED DATA

TECHNICAL FIELD

The present invention generally relates to the distribution of vehicle-related data and, more particularly, to a method for controlling the distribution of vehicle-related data that is collected from the vehicle and is confidentially distributed to one or more authorized recipients.

BACKGROUND OF THE INVENTION

Some manufacturers have developed vehicles that are equipped with telematics-based systems capable of communicating a diverse amount of information to and from the vehicle. For example, there are telematics-based systems that can communicate with a vehicle to obtain information such as diagnostic trouble codes (DTCs), engine oil life, and vehicle mileage. The telematics-based system can then analyze that data at a technical research facility or other remote facility in order to assist the manufacturer in improving the quality and/or design of the vehicle.

Some of the information that is gathered and sent by the telematics-based system, however, may be confidential such that certain parties do not want it shared with others, including the telematics service provider.

SUMMARY OF THE INVENTION

According to one aspect of the invention, there is provided a method for controlling the distribution of vehicle-related data to one or more authorized recipients using a vehicle telematics unit that communicates with a telematics service provider. This method generally comprises the steps of: (a) receiving vehicle-related data at the vehicle telematics unit; (b) identifying the one or more authorized recipients by applying a set of business rules; and (c) wirelessly transmitting vehicle-related data to the one or more identified authorized recipients in a confidential manner that prevents the telematics service provider from having access to the vehicle-related data.

According to another aspect of the invention, there is provided another method for controlling the distribution of vehicle-related data to one or more authorized recipients. This method generally comprises the steps of: (a) receiving vehicle-related data from a vehicle electronic module at the vehicle telematics unit; (b) wirelessly transmitting identification information from the vehicle telematics unit to the telematics service provider; (c) applying a set of business rules that are maintained at the telematics service provider and correspond with the identification information; (d) wirelessly transmitting the results of the application of the set of business rules from the telematics service provider to the vehicle telematics unit; and (e) wirelessly transmitting vehicle-related data to one or more authorized recipients in a confidential manner so that the telematics service provider is unable to access the vehicle-related data.

BRIEF DESCRIPTION OF THE DRAWINGS

Preferred exemplary embodiments of the present invention will hereinafter be described in conjunction with the appended drawings, wherein like designations denote like elements, and wherein.

DETAILED DESCRIPTION OF THE PREFERRED EMBODIMENTS

The controlled distribution method described below uses predetermined business rules set up with a telematics service provider to control the distribution of vehicle-related data that is collected from throughout the vehicle. These business rules can determine which pieces of vehicle-related data, if any, are to be sent to which authorized recipients and can do so in a confidential manner that prevents even the telematics service provider from having access to the vehicle-related data.

Communications System

Figure 1:
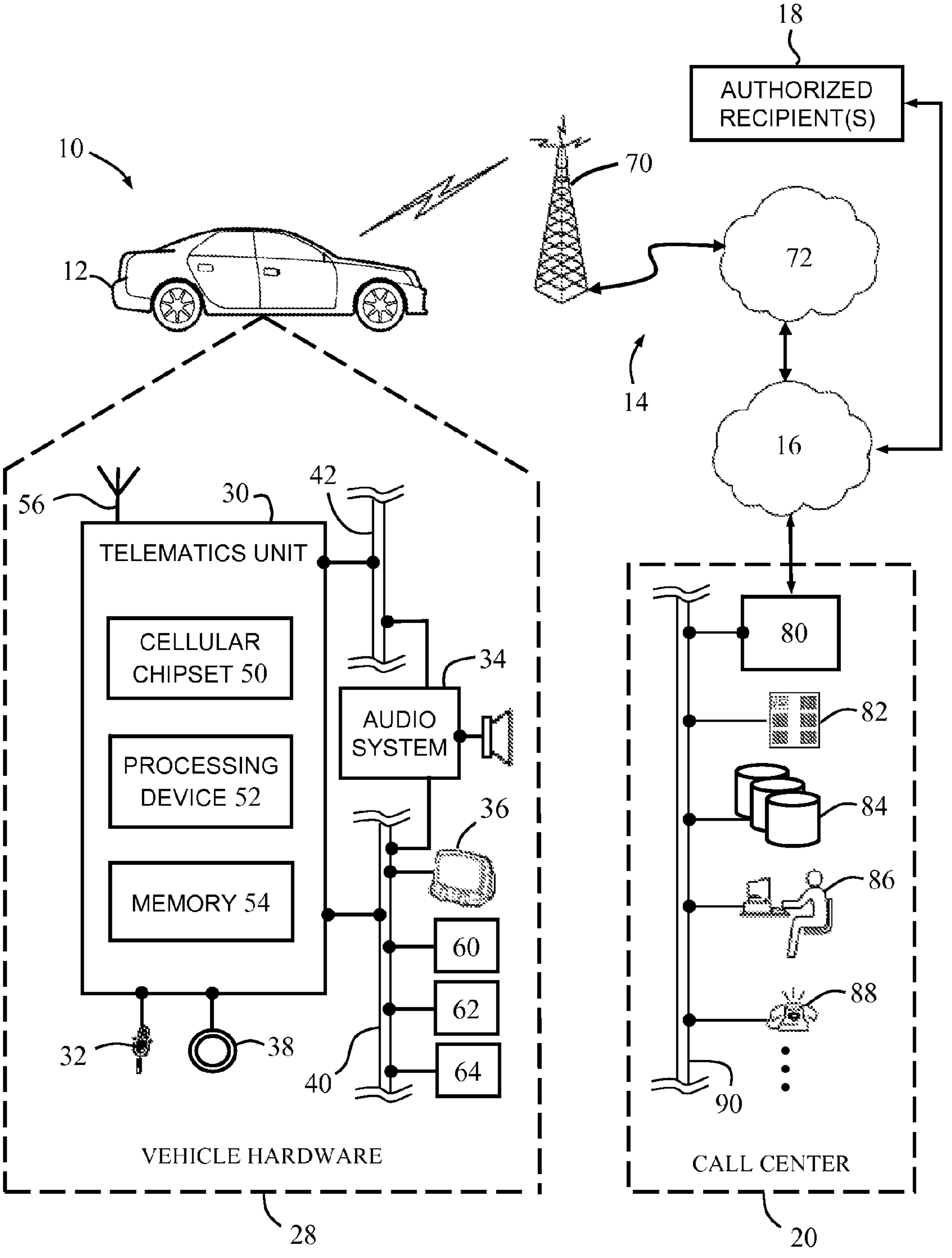
FIG. 1 is a block diagram of a system that is capable of utilizing the controlled distribution method described below.

Beginning with FIG. 1, there is shown an exemplary operating environment that can be used to implement the controlled distribution method disclosed herein. Communications system 10 generally includes a vehicle 12, a wireless carrier system 14, a communications network 16, one or more authorized recipients 18, and a telematics service provider 20. It should be understood that the controlled distribution method can be used with any number of different systems and is not specifically limited to the examples shown here. Also, the overall architecture, setup, and operation, as well as the individual components, of a system such as that shown here are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle hardware 28 is shown generally in FIG. 1 and includes a telematics unit 30, a microphone 32, an audio system 34, a visual display 36, an electronic button or control 38, and several vehicle electronic modules (VEMs) 60-64 that are interconnected using one or more network connections, such as a communications bus 40 or an entertainment bus 42. Examples of suitable network connections include a controller area network (CAN), a media oriented system transfer (MOST), a local interconnection network (LIN), an ethernet, a local area network (LAN), and other appropriate connections such as those that conform with known ISO, SAE and IEEE standards and specifications, to name but a few.

Telematics unit 30 preferably enables wireless voice and/or data communication over wireless carrier system 14 so that the vehicle can communicate with telematics service provider 20, other telematics-enabled vehicles, or some other entity. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. According to one embodiment, telematics unit 30 includes a standard cellular chipset 50 for voice communications like hands-free calling, a wireless modem (not shown) for data transmission, an electronic processing device 52, one or more electronic memory devices 54, and a dual antenna 56. It should be appreciated that the modem can either be implemented through software that is stored in the telematics unit and is processed by electronic processing device 52, or it can be a separate hardware component located internal or external to telematics unit 30. The modem can operate using any number of different standards or protocols such as EVDO, CDMA, GPRS, EDGE, and WiMAX to name but a few.

Electronic processing device 52 can be any type of suitable processing device capable of processing electronic instructions including, but certainly not limited to, microprocessors, microcontrollers, host processors, controllers, vehicle communication processors, and application specific integrated circuits (ASICs). Alternatively, the electronic processing device can work in conjunction with some type of central processing unit (CPU) or other component performing the function of a general purpose processor. Electronic processing device 52 executes various types of electronic instructions, such as software or firmware programs stored in electronic memory 54, which enable the telematics unit to provide a wide variety of services. For instance, electronic processing device 52 can execute programs or process data that helps enable the controlled distribution method discussed herein.

Telematics unit 30 provides too many services to list them all, but several examples include: turn-by-turn directions and other navigation-related services that are provided in conjunction with a GPS-based vehicle navigation unit; airbag deployment notification and other emergency or roadside assistance-related services that are provided in connection with one or more collision sensor interfaces; and infotainment-related services where music, webpages, movies, television programs, videogames and/or other information is downloaded by an infotainment unit and is stored for current or later playback. The above-listed services are by no means an exhaustive list of all of the capabilities of telematics unit 30, but are simply an illustration of some of the services that the telematics unit is capable of offering.

The vehicle electronic modules (VEMs) 60-64 are generally electronic hardware components that are located throughout the vehicle and typically receive input from one or more sensors and use the sensed input to perform diagnostic, monitoring, control, reporting and/or other functions. Each of the VEMs 60-64 is preferably connected by communications bus 40 to the other VEMs, as well as to the telematics unit 30, and can be designed to run various vehicle system and subsystem programs. As examples, VEM 60 can be an engine control module that monitors various aspects of engine operation such as engine oil life and ignition timing, VEM 62 can be a safety control module that regulates operation of one or more airbags in the vehicle, and VEM 64 can be a body control module that governs various electrical components located throughout the vehicle, like the vehicle's power door locks and headlights. Each of the VEMs 60-64 is preferably able to provide a standardized series of diagnostic trouble codes (DTCs) that allow a technician to rapidly identify and remedy malfunctions within the vehicle. As is appreciated by those skilled in the art, the above-mentioned VEMs are only examples of some of the modules that may be used in vehicle 12, as numerous others are also possible. Furthermore, it should be understood that the aforementioned VEMs could be implemented in the form of software instead of being separate hardware components, they could be located within telematics unit 30, or they could be integrated and/or shared with each other or with other systems located throughout the vehicle, to cite but a few possibilities.

Wireless carrier system 14 is preferably a cellular telephone system but could be any other suitable wireless system, such as a satellite-based system, that is capable of transmitting signals between vehicle hardware 28 and telematics service provider 20. According to an exemplary embodiment, wireless carrier system 14 includes one or more cell towers 70, base stations and/or mobile switching centers (MSCs) 72, as well as any other networking components required to connect wireless carrier system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 16 can be a conventional land-based telecommunications network that connects wireless carrier system 14 to telematics service provider 20. For example, land network 16 could include a public switched telephone network (PSTN) and/or a TCP/IP network such as the Internet, as is appreciated by those skilled in the art. Of course, one or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Alternatively, telematics service provider 20 need not be connected via land network 16, but could include wireless telephony equipment so that it can communicate directly with a wireless network, such as wireless carrier system 14.

Authorized recipient 18 is generally any entity that has been authorized to receive vehicle-related data from telematics service provider 20. Examples of suitable authorized recipients include, but are certainly not limited to, the vehicle manufacturer, vehicle component suppliers, the dealership that sold the vehicle, government agencies, and consulting companies such as those that specialize in technical or marketing-related services. Notwithstanding the graphical depiction shown in FIG. 1, it should be appreciated that authorized recipient 18 could be connected to telematics service provider 20 according to one of a number of different ways and does not specifically need to be connected through land network 16. Moreover, block 18 is representative of one or more authorized recipients, as it is anticipated that the controlled distribution method described herein can be used with multiple authorized recipients.

Telematics service provider 20 is designed to provide vehicle hardware 28 with a number of different system backend functions and, according to the exemplary embodiment shown here, includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem can be connected to various devices such as a server 82 and databases 84. Data transmissions may also be conducted by wireless systems, such as 802.11x, GPRS, and the like. Although the illustrated embodiment has been described as it would be used in conjunction with a manned telematics service provider 20, it will be appreciated that the telematics service provider can utilize an unmanned automated call response system and, in general, can be any central or remote facility, manned or unmanned, mobile or fixed, to or from which it is desirable to exchange voice and/or data transmissions. Moreover, telematics service provider 20 could include a call center, a data center, a server farm, a data library, or any other suitable facility or installation capable of exchanging data with the vehicle.

Controlled Distribution Method

Figure 2:
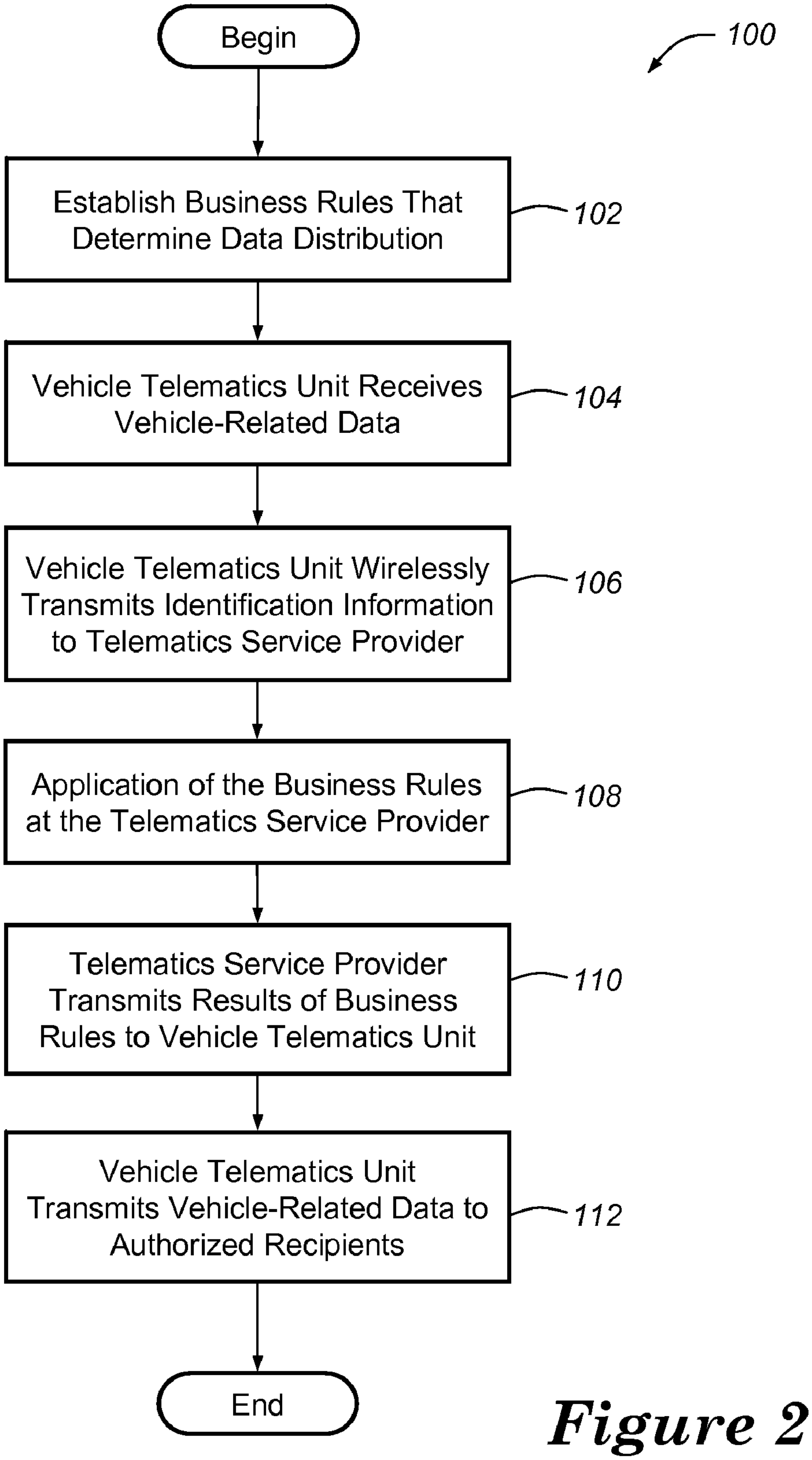
FIG. 2 is a flowchart showing some of the steps of an embodiment of the controlled distribution method.

Turning now to FIG. 2, there are shown some of the steps of an embodiment of a controlled distribution method 100 that wirelessly distributes vehicle-related data that is collected from vehicle 12 to one or more authorized recipients in a confidential manner. Depending upon the particular setup, business rules can be designed so that even the telematics service provider 20 does not have access to certain pieces of vehicle-related data being conveyed by the telematics service provider to the authorized recipients.

Beginning with step 102, a set of business rules is established with telematics service provider 20 that generally determines which vehicle-related data, if any, is to be distributed and which authorized recipients are to receive it. The business rules can be established by the vehicle manufacturer, the vehicle owner, or any other duly authorized party, and are preferably established with telematics service provider 20 before the distribution of vehicle-related data occurs. Moreover, it is possible for a single set of business rules to be applicable across a variety of vehicle models each having a number of individual vehicles, for a single set of business rules to only apply to a certain vehicle model having a number of individual vehicles, or for a single set of business rules to only apply to an individual vehicle. Put differently, the creator of the business rules, whether it be the vehicle manufacturer or others, could develop wide-ranging, generic business rules that have application across many different types of vehicles, or the business rules could be so specific that they need to be individually tailored for each vehicle that uses them. Because manual creation of numerous sets of business rules can be quite laborious, computer programs, algorithms, or other systems that automatically create business rules are generally preferred.

The following examples are provided to illustrate some of the types of business rules that could be used with the present method; however, it should be appreciated that other kinds of business rules could also be used. A first type of business rule is a 'manufacturer-type' business rule, which is basically any business rule that makes a decision regarding data distribution based on the manufacturer of the vehicle or the vehicle component to which the data pertains. For instance, a business rule could be set up where all vehicle-related data that relates to the vehicle's engine is confidentially distributed only to the engine manufacturer, which is usually the vehicle manufacturer. In such a case, if engine control module 60 were to send a DTC regarding the vehicle's ignition timing or the compression in the cylinders, then the manufacturer-type business rule could dictate that only the engine manufacturer receive that information. A second type of possible business rule is a 'service-type' business rule, which is generally any business rule that makes a decision regarding data distribution based on the provider of a service to which the data pertains. For example, if engine control module 60 were to generate a message regarding engine oil life, then the service-type business rule could confidentially distribute that information to the dealership where the vehicle was purchased so that an oil change appointment could be arranged.

It is also possible for a single piece of vehicle-related data to be utilized by business rules that fall within different types or categories. For instance, deployment of one or more of the vehicle's airbags usually causes a safety control module 62 to generate an airbag deployment notification. This type of vehicle-related data could be utilized by both a manufacturer-type business rule, which would likely distribute the deployment notification to the maker of the airbag, and a service-type business rule, which would likely send the deployment notification to an emergency responder or other emergency service provider. Furthermore, it is possible for a business rule to distribute a single piece of vehicle-related data to more than one authorized recipients. In the airbag deployment notification example above, the manufacturer-type business rule could route the deployment notification to the maker of the airbag, the maker of the instrument panel in which the airbag is employed, and the vehicle manufacturer.

Also, the business rules could be designed to assign different priorities to different pieces of vehicle-related data such that those messages and/or pieces of data being of a more urgent nature can be distributed before those that are less urgent. Again turning to the airbag deployment notification example, the service-type business rule that distributes the airbag notification to an emergency responder could be programmed with a priority that supersedes that of the manufacturer-type business rule that sends the corresponding vehicle-related data to the airbag's manufacturer. These are only some of the possibilities for business rules, as many other features, characteristics, attributes, variations, etc. exist and could also be used.

At some time after the point when the business rules have been developed, stored and implemented, the normal processing loop begins at step 104 where telematics unit 30 receives one or more pieces of vehicle-related data from a source located within the vehicle. This information can be generated by a vehicle electronic module 60-64, or some other unit, component, device, program, script, etc. operating throughout the vehicle. According to two of the foregoing examples, illustrations of this step include when telematics unit 30 receives a DTC regarding ignition timing from engine control module 60, and when the telematics unit receives the airbag deployment notification from safety control module 62; both of which are preferably received over vehicle communication bus 40. These are, of course, only examples of step 104, as numerous other types of vehicle-related data from other sources could also be received.

Next, according to this particular embodiment where application of the business rules is performed at telematics service provider 20, telematics unit 30 wirelessly transmits certain identification information to the telematics service provider so that the service provider knows with whom it is communicating, step 106. It should be recognized that in an alternative embodiment, which will be subsequently described, application of the business rules occurs at the vehicle instead of at the telematics service provider and thus obviates the need for step 106. The identification information in step 106 preferably includes an identifier that distinguishes either the vehicle or the subscriber; examples can include a vehicle identification number (VIN), an electronic serial number (ESN) for the telematics unit, a mobile identification number (MIN) for the telematics unit, a mobile directory number (MDN) for the telematics unit, and a subscriber account number. It is also preferable that the identification information lack any restricted or confidential vehicle-related data to thereby keep such vehicle-related data confidential from the telematics service provider. Instead, the identification information functions as a basic identifier so that telematics service provider can then apply the appropriate business rules for that particular vehicle or subscriber account. In some instances, step 106 can also transmit non-confidential information to the telematics service provider such as the business rule category or type that the vehicle-related data falls within, the vehicle component that the vehicle-related data pertains to, or the current location of the vehicle which can be helpful in situations where an emergency response or similar service is required.

In step 108, the business rules are generally stored and applied at telematics service provider 30, which uses the transmitted information to look up the corresponding business rules and to apply those rules so that one or more authorized recipients, if any, can ultimately be identified. As an example, if step 106 wirelessly sends a message to the telematics service provider containing a VIN, the telematics service provider can perform a VIN-based lookup to find the corresponding business rules for that vehicle. Once the business rules have been found and applied, the results can be wirelessly sent back to vehicle telematics unit 30, step 110, so that the vehicle telematics unit knows the authorized recipients to which it should send the vehicle-related data that it previously collected. In some instances the results sent from telematics service provider 20 specifically identify the authorized recipients, while in others the results simply provide information so that the vehicle can identify the authorized recipients.

In step 112, vehicle telematics unit 30 wirelessly transmits the vehicle-related data previously collected to one or more properly authorized recipients. This data could be in the original form in which it was gathered, or it could already be processed and/or altered by one or more components of vehicle hardware 28 or software. Again, by sending only non-confidential information to the telematics service provider in step 106, the actual contents of the vehicle-related data that were collected in step 104 are preserved and distributed to the authorized recipients in a confidential or restricted manner that makes them inaccessible to even the telematic service provider.

According to another embodiment, the business rules are saved and applied at vehicle 12, instead of at telematics service provider 20. In this embodiment, after telematics unit 30 receives the vehicle-related data in step 104 it applies the pre-established business rules to determine where the vehicle-related data should be sent. As an example, if engine control module 60 sends telematics unit 30 an electronic message indicating the current mileage of the vehicle, the telematics unit could employ the appropriate resources within the vehicle to apply the proper business rules. For instance, a services-type business rule could be applied that identifies the dealership where the vehicle was sold as the authorized recipient of this vehicle-related data. This would enable the dealership to more effectively communicate with the vehicle owner or the vehicle itself regarding warranty, lease or other mileage-sensitive subjects so that appropriate service could be provided, if needed.

There are a number of different timing conditions that could be used to determine when and how frequently vehicle telematics unit 30 should send the various transmissions. For instance, the identification information transmissions of step 106 could be scheduled to occur in a periodic fashion such as, for example, once a day, week, month, etc. Alternatively, the vehicle-related data transmissions sent in step 112 could be in response to some event occurring at vehicle 12, telematics service provider 20, or elsewhere. Moreover, different events or categories of events could have different priority levels, as previously explained, which impact the timing of their corresponding transmissions. High priority events or vehicle-related data could be quickly disseminated as soon as they were received, as opposed to waiting for a periodic transmission. According to another embodiment, the transmission in step 106 could be in response to a request initiated at telematics service provider 20 or at some third party.

It is preferable that the various wireless transmissions be as compact and secure as possible. Therefore, the use of various techniques known in the art like encryption, scrambling, compression, etc. could be employed to maintain confidentiality of the vehicle-related data.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, in the foregoing embodiments the set of business rules were maintained and applied at either the telematics service provider or at the vehicle. Alternatively, one or more sets of business rules could be stored, maintained, employed and/or executed at a location other than the telematics service provider and the vehicle, such as at a third party facility. All such other embodiments, changes, and modifications are intended to come within the scope of the appended claims.

As used in this specification and claims, the terms "for example," "for instance," "like," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for controlling the distribution of vehicle-related data to one or more authorized recipients using a vehicle telematics unit that communicates with a telematics service provider, comprising the steps of:

(a) receiving vehicle-related data at the vehicle telematics unit;

(b) thereafter identifying the one or more authorized recipients by applying a set of business rules; and (c) wirelessly transmitting the vehicle-related data to the one or more identified authorized recipients in a confidential manner that prevents the telematics service provider from having access to the vehicle-related data.

2. The method of claim 1, wherein step (a) further comprises receiving vehicle-related data from a vehicle electronic module (VEM).

3. The method of claim 1, wherein the set of business rules in step (b) is established by the vehicle manufacturer.

4. The method of claim 1, wherein step (b) further comprises applying a single set of business rules that are applicable across a plurality of vehicle models each having a plurality of individual vehicles.

5. The method of claim 1, wherein step (b) further comprises applying a single set of business rules that are only applicable to a single vehicle model having a plurality of individual vehicles.

6. The method of claim 1, wherein step (b) further comprises applying a single set of business rules that are only applicable to an individual vehicle.

7. The method of claim 1, wherein step (b) further comprises applying a set of business rules that includes at least one manufacturer-type business rule that considers the manufacturer of the vehicle component to which the vehicle-related data pertains.

8. The method of claim 7, wherein the manufacturer-type business rule utilizes at least one piece of vehicle-related data selected from the list consisting of: a diagnostic trouble code (DTC), an airbag deployment notification, an engine oil life reading, a vehicle battery reading, a vehicle mileage reading, a vehicle location, and a tire pressure.

9. The method of claim 1, wherein step (b) further comprises applying a set of business rules that includes at least one service-type business rule that considers the provider of a service to which the vehicle-related data pertains.

10. The method of claim 9, wherein the service-type business rule utilizes at least one piece of vehicle-related data selected from the list consisting of: a diagnostic trouble code (DTC), an airbag deployment notification, an engine oil life reading, a vehicle battery reading, a vehicle mileage reading, a vehicle location, and a tire pressure.

11. The method of claim 1, wherein step (b) further comprises applying a set of business rules that generally distributes the same piece of vehicle-related data to a plurality of authorized recipients.

12. The method of claim 1, wherein step (b) further comprises applying a set of business rules that assigns different priorities to different pieces of vehicle-related data.

13. The method of claim 1, wherein step (b) further comprises wirelessly transmitting identification information from the vehicle telematics unit to the telematics service provider, using the identification information when applying the set of business rules at the telematics service provider, and wirelessly transmitting the results of the application of the set of business rules from the telematics service provider to the vehicle telematics unit.

14. The method of claim 13, wherein the identification information includes at least one identifier selected from the group consisting of: a vehicle identification number (VIN), an electronic serial number (ESN), a mobile identification number (MIN), a mobile directory number (MDN), and a subscriber account number.

15. The method of claim 1, wherein step (b) further comprises retrieving a set of business rules that are maintained at the vehicle, and applying the set of business rules at the vehicle.

16. A method for controlling the distribution of vehicle-related data to one or more authorized recipients using a vehicle telematics unit that communicates with a telematics service provider, comprising the steps of:

(a) receiving vehicle-related data from a vehicle electronic module at the vehicle telematics unit; and thereafter:

(b) wirelessly transmitting identification information from the vehicle telematics unit to the telematics service provider;

(c) applying a set of business rules that are maintained at the telematics service provider and correspond with the identification information, wherein the set of business rules generally determines which authorized recipients are to receive vehicle-related data;

(d) wirelessly transmitting the results of the application of the set of business rules from the telematics service provider to the vehicle telematics unit so that authorized recipients can be determined; and (e) wirelessly transmitting the vehicle-related data to one or more authorized recipients in a confidential manner so that the telematics service provider is unable to access the vehicle-related data.

17. The method of claim 16, wherein the set of business rules in step (c) is established by the vehicle manufacturer.

* * * * *